United States Patent [19]

Lee

[11] Patent Number: 5,541,931
[45] Date of Patent: Jul. 30, 1996

[54] DATA OPTICAL TRANSMISSION APPARATUS UTILIZING MULTIPLEXER/DEMULTIPLEXER MODE

[75] Inventor: Su-Bong Lee, Kyonggi-Do, Rep. of Korea

[73] Assignee: Hyundai Electronics Industries Co., Ltd., Rep. of Korea

[21] Appl. No.: 488,254

[22] Filed: Jun. 7, 1995

[30] Foreign Application Priority Data

Mar. 27, 1995 [KR] Rep. of Korea .................. 95-6576

[51] Int. Cl.$^6$ .................. H04J 14/08; H04J 3/02; H04L 5/22
[52] U.S. Cl. .................. 370/112; 359/135
[58] Field of Search .................. 370/112, 56; 359/115, 359/135

[56] References Cited

U.S. PATENT DOCUMENTS

| Re. 29,215 | 5/1977 | Carney et al. | 370/112 |
|---|---|---|---|
| 4,316,282 | 2/1982 | Macina | 370/112 |
| 4,807,221 | 2/1989 | Stummer | 370/112 |
| 4,933,934 | 6/1990 | Aikoh et al. | 370/112 |
| 5,029,333 | 7/1991 | Graves et al. | 370/112 |
| 5,031,235 | 7/1991 | Raskin et al. | |
| 5,040,170 | 8/1991 | Upp et al. | 370/112 |
| 5,128,790 | 7/1992 | Heidemann et al. | |
| 5,162,937 | 11/1992 | Heidemann et al. | |
| 5,265,095 | 11/1993 | Fiedler et al. | 370/112 |
| 5,311,519 | 5/1994 | Getzlaff et al. | 370/112 |

Primary Examiner—Wellington Chin
Attorney, Agent, or Firm—Bryan Cave LLP; David M. Klein

[57] ABSTRACT

A data optical transmission apparatus utilizing multiplexer/demultiplexer mode for multiplexing and transmitting 24 channels of 51.84 Mbps frame, and for demultiplexing the frame data for realigning as twenty four pieces of frame data of 51.84 Mbps. The data optical transmission apparatus of the present invention utilizes a synchronous transmission apparatus of which transmission basic unit is 51 Mbps. The synchronous transmission apparatus has a convenience transmission means of simple bit interleaving mode and eight application software IC (ASIC) each of which has three 51 Mbps framers/reframers. By using the framers/reframers, twenty four channels of 51 Mbps frame data are produced, which are multiplexed for being transmitted as 1.2 Gbps data. At the receiving section, data of 1.2 Gbps is demultiplexed by 24 to 1, thus extracting twenty four pieces of frame data of 51 Mbps. The extracted 51 Mbps frame data is produced in the order reverse to the order of transmission. In the present invention, for aligning the extracted frame data of 51 Mbps in the initial data input order, channel aligning data is transmitted using 64 Kbps channel of 51 Mbps framer. The channel partition information extracted from the channel aligning data is used as the output address of 32×32 switch so that the initial input data order is restored and the frame data of 51 Mbps can be transmitted to desired channels.

8 Claims, 5 Drawing Sheets

DATA OPTICAL TRANSMISSION APPARATUS UTILIZING MULTIPLEXER/DEMULTIPLEXER MODE

BACKGROUND OF THE INVENTION

This invention relates to a data optical transmission apparatus utilizing multiplexer/demultiplexer mode, which multiplexes and transmits twenty four pieces of frame data of 51.84 Mbps (Mega bits per seconds), and receives and demultiplexes the frame data for realigning as twenty four pieces of frame data of 51.84 Mbps, in a data transmission apparatus such as an optical cable television system.

In general, an optical cable television system transmits TV data of 44,736 Mbps through 600M or 2.5G transmission equipment.

The 600M or 2.5G transmission equipment is very complicated and expensive, thus exerting a substantial influence on the price of the whole system of data transmission equipment, which impose economic burdens on users.

SUMMARY OF THE INVENTION

An object of the present invention is to provide a data optical transmission apparatus utilizing multiplexer/ demultiplexer mode, which has simple construction and which transmits data of 1.2 Gbit by multiplexer/demultiplexer mode, with basic unit of transmission being frame data of 51 Mbps.

For achieving the above-described object, the data optical transmission apparatus of the present invention utilizes a synchronous transmission apparatus of which transmission basic unit is 51 Mbps. The synchronous transmission apparatus has a convenience transmission means of simple bit interleaving mode and eight application software IC (ASIC) each of which has three 51 Mbps framers/reframers. By using the framers/reframers, twenty four channels of 51 Mbps frame data are produced, which are multiplexed for being transmitted as 1.2 Gbps data.

At the receiving section, data of 1.2 Gbps is demultiplexed by 24 to 1, thus extracting twenty four pieces of frame data of 51 Mbps.

The extracted 51 Mbps frame data is produced in the order reverse to the order of transmission.

In the present invention, for aligning the extracted frame data of 51 Mbps in the initial data input order, channel aligning data is transmitted using 64 Kbps channel of 51 Mbps framer. The channel partition information extracted from the channel aligning data is used as the output address of 32×32 switch so that the initial input data order is restored and the frame data of 51 Mbps can be transmitted to a desired channel.

BRIEF DESCRIPTION OF THE DRAWINGS

Other objects of the present invention will become apparent from the following description in conjunction with the drawings, in which.

DETAILED DESCRIPTION OF THE INVENTION

Figure 1:
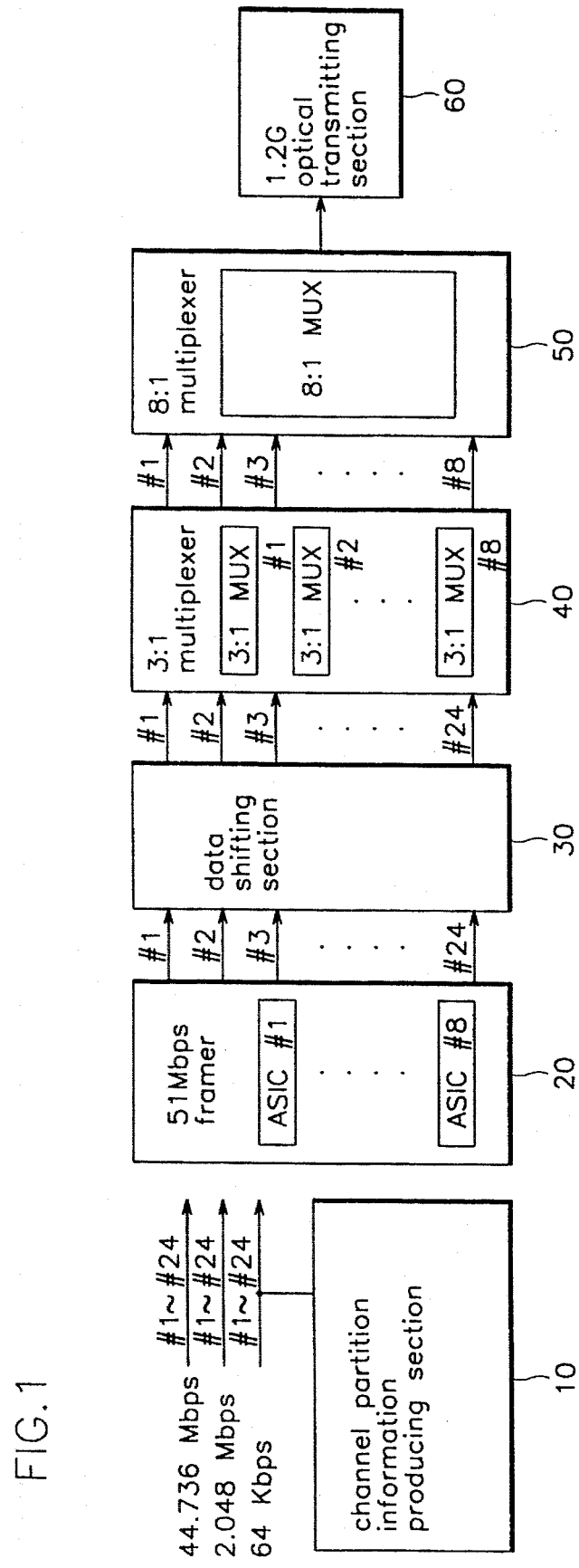
FIG. 1 is a block diagram of a 24:1 multiplex means of the data optical transmission apparatus of the present invention.

FIG. 1 is a block diagram of a 24:1 multiplex means of the data optical transmission apparatus of the present invention, which multiplexes and generates twenty four pieces of frame data. As shown, the data optical transmission apparatus of the present invention comprises: a channel partition information producing section 10 for producing channel partition information of twenty four channels for applying channel partition information to twenty four channels of 64 Kbps; a 51 Mbps framer 20 for producing 51 Mbps frame data at each channel from 44.736 Mbps data of twenty four channels, 2.048 Mbps data of twenty channels and the 64 Kpbs data of twenty four channels which has the channel partition information produced by the channel partition information producing section the 10; a data shifting section 30 for shifting the 51 Mbps frame data generated by the 51M framer 10 in the unit of frame for preventing continuous repetition of "1" or "0" occurred by multiplex of simple bit interleaving mode; a 3:1 multiplexer 40 for multiplexing twenty four 51M frame data generated by the data shifting section 30 by 3:1; a 8:1 multiplexer 50 for multiplexing by 8:1 eight frame data which has been multiplexed by the 3:1 multiplexer 40; an optical transmitting section of 1.2 Gbps (60) which generates the frame data of 1.2 Gbps which has been multiplexed by the 8:1 multiplexer 50 as an optical signal.

The 44.736 Mbps data is TV data, and 2 Mbps data is B channel analog telephone signal or narrow-band ISDN (Integrated services digital network) signal of 2B+D channel.

Figure 2:
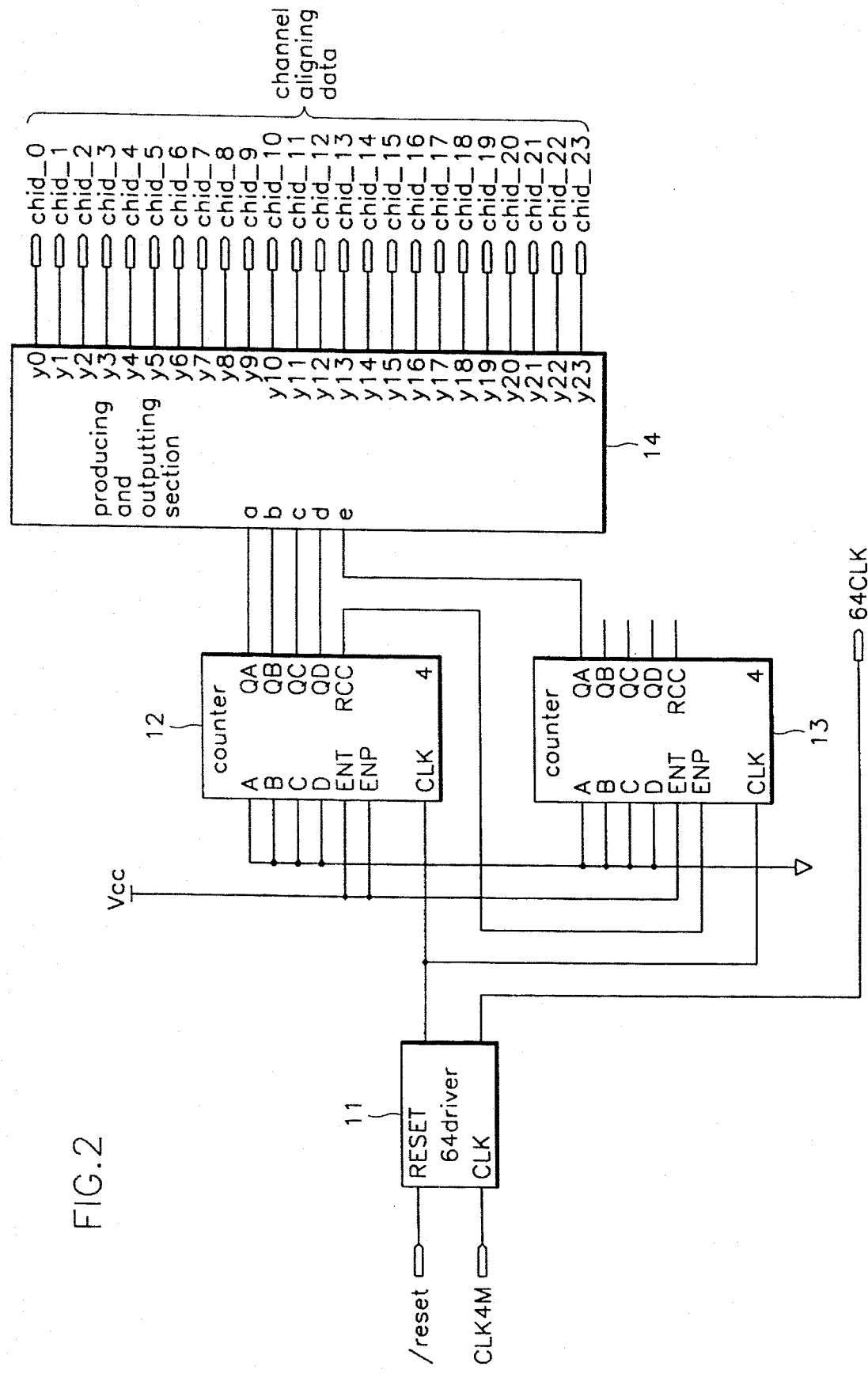
FIG. 2 is a detailed view showing one example of the channel partition information producing section of FIG. 1.

FIG. 2 is a circuit diagram showing one example of the channel partition information producing section 10 of the 24:1 multiplex means of FIG. 1, which produces channel partition information. As shown, the channel partition information producing section 10 comprises: a 1/64 divider 11 reset by reset signal (/RESET) for dividing clock signals (CLK4M) by 1/64; counters 12, 13 connected in series for counting the output signal of the 1/64 divider 11; and a producing and outputting section 14 for producing twenty four different output partition information with the output signals of the counters 12, 13.

The channel partition information producing section 10 of the 24:1 multiplex means of the present invention produces channel partition information for partitioning 51 Mbps frames in each of the twenty four channels of 64 Kpbs.

In the channel partition information producing section 10, after being reset by the reset signal (/RESET), the 1/64 divider divides clock signal (CLK4M) by 1/64 and generates the divided signal. The counters 12, 13 counts the 1/64 divided signal. According to the output signal of the counters 12, 13, the producing and outputting section 14 produces channel aligning data (chid_0–23) including twenty four different output partition information.

For example, the following shows the formatting of the channel aligning data (chid_0–23) including channel partition information, which is generated by the producing and outputting section 14.

```
data of channel #1    :  11101000 + 00000 + 0 + XX
data of channel #2    :  11101000 + 00001 + 1 + XX
      .                        .
      .                        .
      .                        .
data of channel #24   :  11101000 + 10111 + 0 + XX
                           (I)      (II)   (III)
``` where (I) is a frame word of 8 bits, (II) is channel partition data of 5 bits, and (III) is parity information (even parity) of 1 bit, and XX is 2 bits to which is applied an optional number of "0" or "1".

The channel aligning data (chid_0~23) of the producing and outputting section 14 of the channel partition information producing section 10 is input to the framer 20 of 51 Mbps. Also, 44.736 Mbps data of twenty four channels and 2.048 Mbps data of twenty four channels are input to the 51 Mbps framer 20.

The 44.736 Mbps data of twenty four channels is 3-channel data for TV, and 2.048 Mbps data of twenty four channels is B channel analog telephone signal or narrowband ISDN (Integrated services digital network) signal of 2B+D channel The 51 Mbps framer 20 consists of eight ASIC (application software IC) each of which has three 51 Mbps framers, and frames and generates the channel aligning data (chid_0~23), 44.736Mbps data and 2.048 Mbps data into 51 Mbps.

The twenty four pieces of frame data framed and generated by the 51 Mbps framer 20 is shifted in the unit of frame by the data shifting section 30 for preventing continuous repetition of "1", "0" caused by multiplex of simple bit interleaving mode.

The output signal of the data shifting section 30 is double-multiplexed by sequentially passing the 3:1 multiplexer 40 and the 8:1 multiplexer 50. The double-multiplexed output signal is converted into an optical signal and transmitted by the 1.2G optical transmitting section 60.

The optical signal transmitted by the 1.2G optical transmitting section 60 carries the channel partition information which partitions each of twenty four of signals, so that the order of data may be aligned as initial input state during demultiplexing because the order of data is reversed during transmission.

Figure 3:
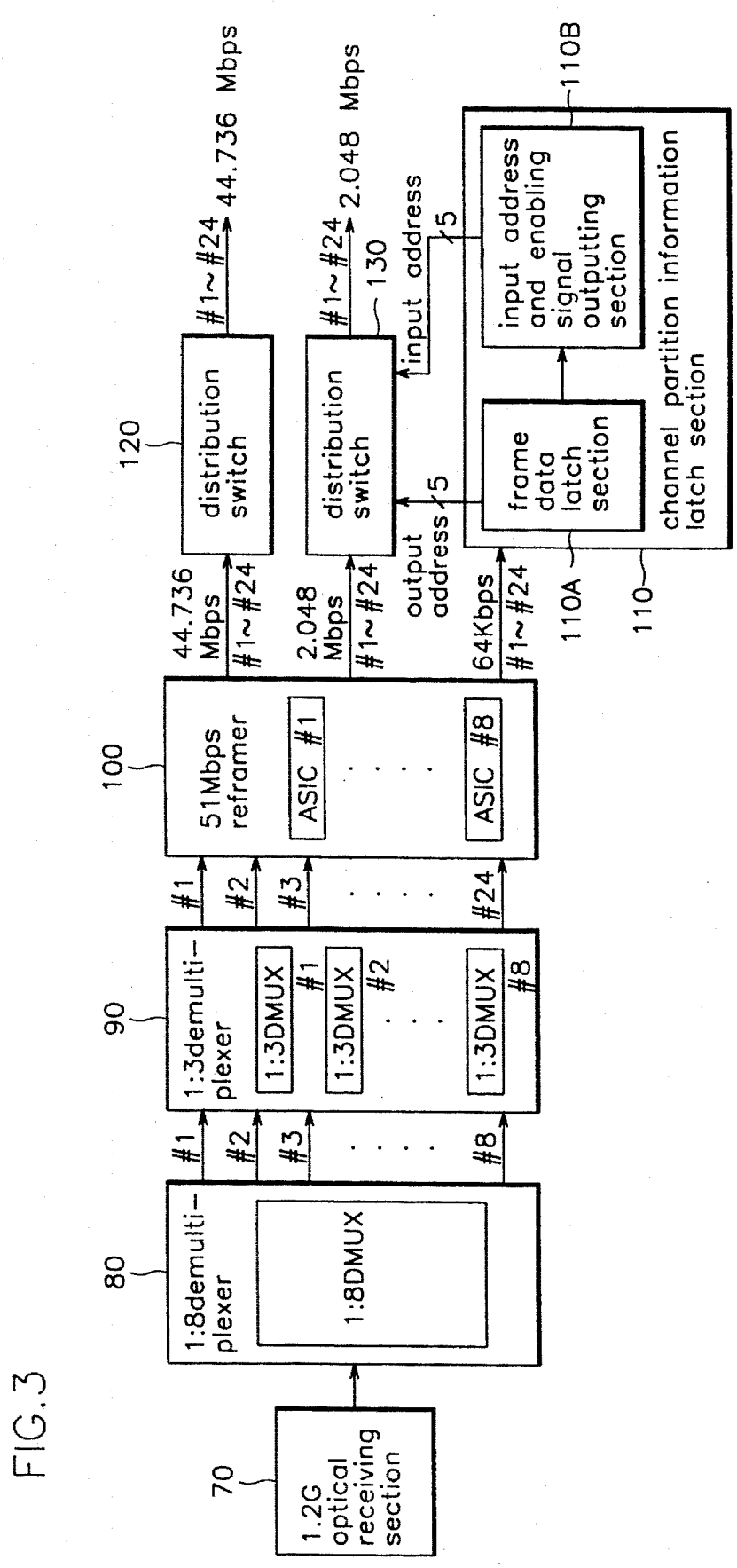
FIG. 3 is a block diagram of a 1:24 demultiplexer means of the data optical transmission apparatus of the present invention.

FIG. 3 is a block diagram of a 1:24 demultiplex means of the data optical transmission apparatus of the present invention, which demultiplexes the optical signal transmitted by the twenty four:1 multiplex means and distributes the demultiplexed optical signal to twenty four subscribers. As shown, the 1:24 demultiplex means comprises: 1.2 Gbps optical receiving section 70 for receiving the optical signal from the 1.2 Gbps optical transmitting section 60 of the 24:1 multiplex means and for converting the signal into electrical signal; a 1:8 demultiplexer 80 for demultiplexing the 1.2G frame data received from the optical transmitting section 70 in the ratio of 1:8; a 1:3 demultiplexer 90 for demultiplexing the demultiplexed frame data of the 1:8 demultiplexer 80 in the ratio of 1:3, and for separating the 1:3 demultiplexed data into twenty four frame data; a 51 Mbps reframer 100 for reframing the twenty four 51 Mbps frame data generated by the 1:3 demultiplexer 90 into 44.736 Mbps data, 2.048 Mbps data and 64 Kbps data; distribution switches 120, 130 for switching twenty four 44.736 Mbps data and twenty four 2.048 Mbps data and for distributing the switched data to each subscriber system; and a channel partition information latch section 110 for receiving the 64 Kbps data out of the data separated by the 51M reframer 100, detecting frame word, the head of channel partition information, latching the channel partition information, producing input/output address which performs input/output operation of each channel data with respect to the distribution switches 120, 130 and outputting the input/output address to the distribution switches 120, 130.

Figure 4:
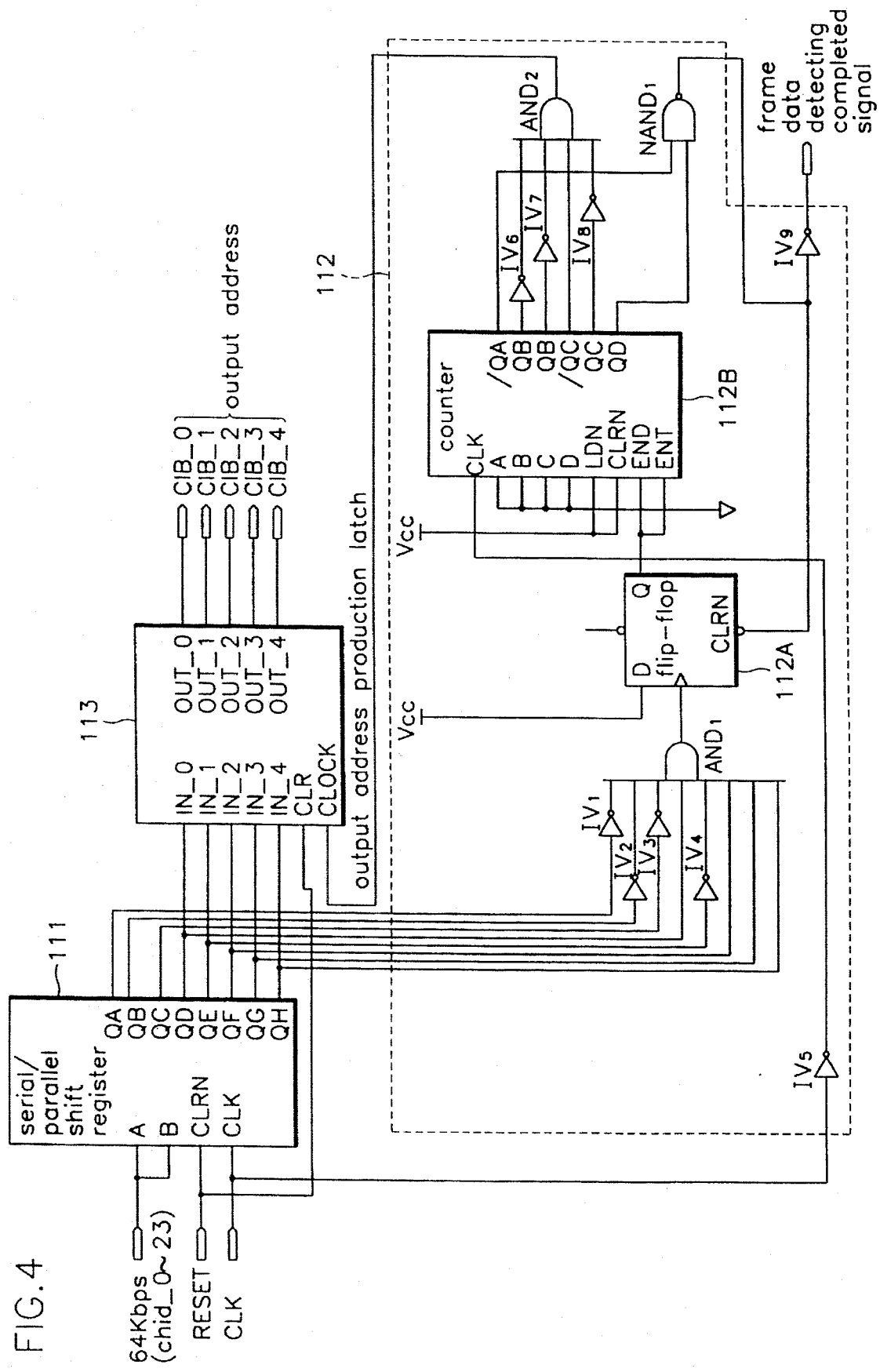
FIG. 4 is a detailed view showing one example of the frame data latch section of the channel partition information latch section of FIG. 3.

FIG. 4 is a detailed view showing one example of the frame data latch section 110A of the channel partition information latch section 110 of the 1:24 demultiplex means of FIG. 3. As shown, the frame data latch section 110A comprises: a serial/parallel shifting register 111 for generating the channel aligning data (chid_0~23) in parallel, which is applied in serial; a frame word detecting section 112 comprising inverters (IV1~IV9), AND gates (AND1, AND2), flip-flops 112A, counter 112B, and NAND gate (NAND1) for detecting frame word of 8 bits from the output signal of the serial/parallel shift register 111 and for generating frame data detecting completed signal; and an outputting address producing latch section 113 for storing the channel partition information generated by the serial/parallel shifting register 111 and for generating the information as addresses according to the output signal of the frame word detecting section 112.

Figure 5:
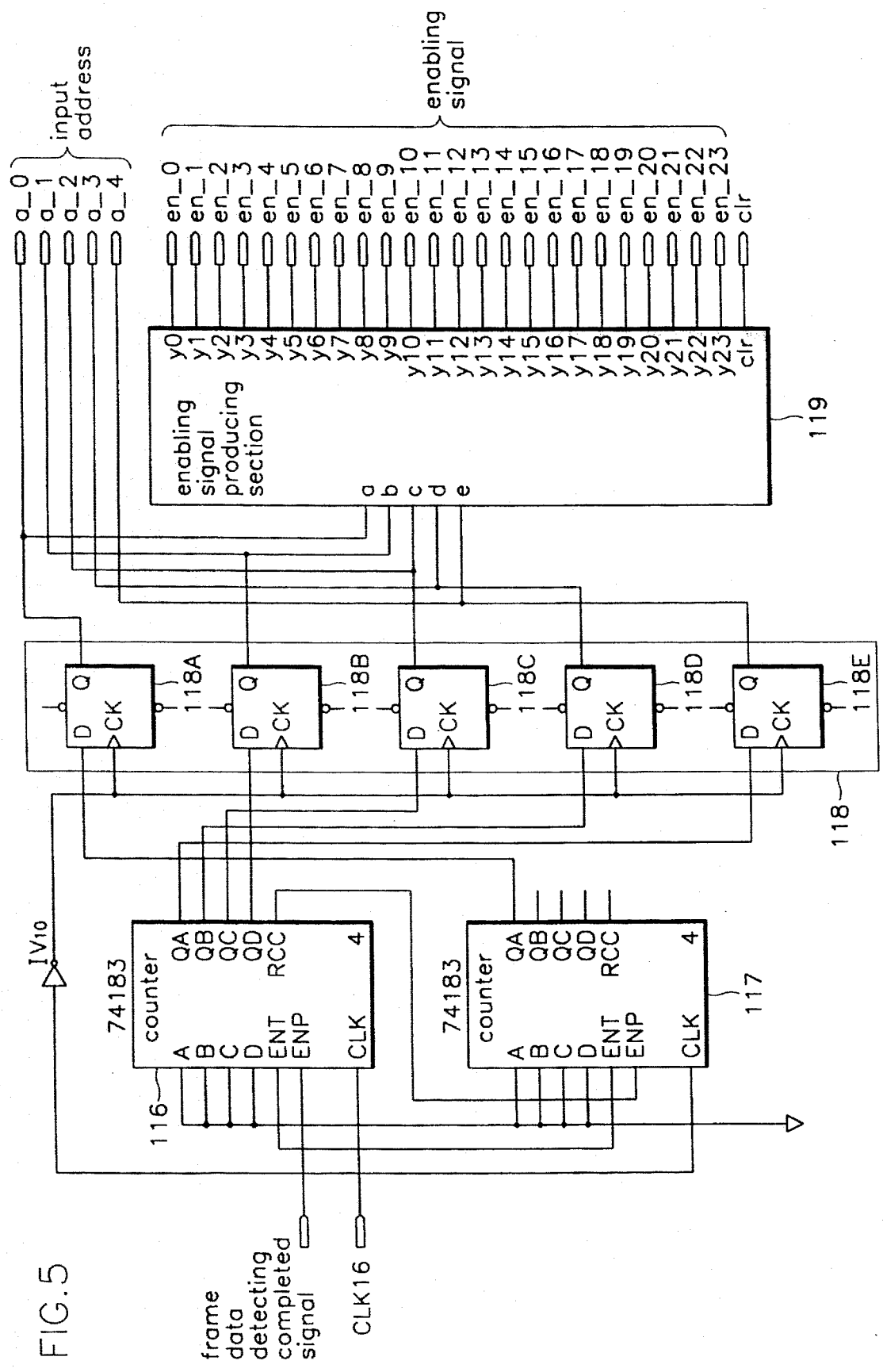
FIG. 5 is a detailed view showing one example of the input address/enabling signal outputting section of the channel partition information latch section of FIG. 3.

FIG. 5 is a detailed view showing one example of the input address/enabling signal outputting section 110B of the channel partition information latch section 110 of FIG. 3. As shown, the input address/enabling signal outputting section 110B comprises: counters 116, 117 enabled according to the frame data detecting completed signal generated by the frame data latch section 110A, and for counting clock signal (CLK16); an input address outputting section 118 for storing the output signal of the counters 116, 117 at flip-flops 118A~118E and generating the output signal of the counters 116, 117 as input addresses ($q_{13}$ 0~4) according to the output addresses (CIB_0~4) which are designated by the frame data latch section 110A; an enabling signal producing section 119 for identifying that all the input/output addresses of the distribution switches 120,130 are designated according to the output signal of the input address outputting section 118, and for producing enabling signals (en_0~23) which initiates switch output.

As described-above, the 1:24 demultiplex means receives the optical signal transmitted from the 1.2G optical transmitting section 60 of the 24:1 multiplex means and produces service signal output to twenty four subscribers.

That is, the transmission signal of the optical transmitting section 60 is applied to the 1.2G optical receiving section 70 and converted into electrical signal. The received signal is double-demultiplexed through the 1:8 demultiplexer 80 and the 1:3 demultiplexer 90 for generating twenty four 51 Mbps frame data.

The twenty four 51 Mbps output frame data is reframed by the 51 Mbps reframer 100 and generated as the 44.736 Mbps, 2.048 Mbps and 64 Kbps data.

Of the data reframed by the reframer 100, the 44.736 Mbps and the 2.048 Mbps data are respectively input to the distribution switches 120, 130. The 64 Kbps data is applied to the frame data latch section 110A of the channel partition information latch section 110.

In the frame data latch section 110A, the 64 Kbps data which is input from the 51 Mbps reframer 100 in serial is shifted and generated by the serial/parallel shifting register 111 according to the clock signal (CLK). Of the output signal, the frame word detecting section 112 detects frame word.

In detail, the channel aligning data (chid_0~23) which is produced and generated by the channel partition information producing section 10 of the twenty four:1 multiplex means consists of frame word of 8 bits, channel partition information of 5 bits, parity information of 1 bit and an optional value of 2 bits. The frame word of 8 bits is "11101000". The serial/parallel shift register 111 shifts and generate the channel aligning data (chid_0~23) in parallel.

When the frame word of 8 bits, "11101000" is output to the output terminals (QH~QA), with the channel aligning data (chid_0~23) being shifted and generated in parallel by the serial/parallel shift register 111, the inverters (IV1~IV4) of the frame word detecting section 112 produce high voltage causing the AND gate (AND2) to produce high voltage and clock signal to apply to the flip-flop 112A.

Then, the flip-flop 112A produces the output of high potential to the output terminal (Q), causing the counter 112B to be enabled, whereby clock signal (CLK) inverted by the inverter (IV5) is counted. If a predetermined value is counted, the AND gate (AND2) produces the output of high potential, thus producing the latch signal output to the output address producing latch section 113.

That is, the channel arranging data (chid_0~23) is applied by the channel partition information of 5 bits following the frame word of 8 bits. If the channel partition information of 5 bits is shifted by the serial/parallel shifting register 111 and generated to the output terminals (QH~QD), the counter 112B produces the output of low electrical potential to the output terminals (QA, QB, QC) and produces the output of high potential to the output terminal (QC).

Accordingly, the AND gate (AND2) produces the output of high voltage and applies latch signal to the output address producing latch section 113. The output address producing latch 113 produces the channel partition information of 5 bits which is produced by the serial/parallel shift register 111 as output address which designates the output addresses (CIB_0~4) of the storing and distribution switches 120, 130.

When the counter 112B continuously counts the clock signal and applies the output of high voltage to the output terminals (/QA, QD), the NAND gate (NAND1) produces the output of low electrical potential. By the low voltage, the flip-flop 112A is cleared, whereby the next channel aligning data (chid_0~23) is ready to be input and the output signal of the NAND gate (NAND1) produces as the frame data detecting completed signal of high electrical potential through the inverter (IV9).

The frame data latch section (110) is provided twenty four in numbers. The twenty four frame data latch sections 110A receive the twenty four channel aligning data (chid_0~23), respectively and designate the output addresses (CIB_0~4) with respect to the respectively applied aligning data. When all the frame data detecting completed signals are produced from the twenty four pieces of frame data latch sections 110A, the input address/enabling signal outputting section 110B are operated.

The counters 116, 117 of the input address/enabling signal outputting section 110B sequentially count clock signal (CLK16) when all the twenty four pieces of frame data latch sections 110A produce frame data detecting completed signal. The counted signal is stored by the flip-flops (118A~118E) of the input address output section 118 and generated as the input addresses (q_0~4). The enabling signal producing section 119 sequentially produces twenty four enabling signals from the output signals of the flip-flops (118A~118E), whereby the distribution switches 120, 130 switch and distribute the data of 44.736 Mbps and 2.048 Mbps from the reframer 100.

That is, when the frame data latch section 110A produces the output addresses (CIB_0~4) and the input addresses (q_0~4) are produced, the enabling signal producing section 119 produces enabling signal with respect to each channel, whereby the distribution switches 120, 130 distribute and produce data of 4.736 Mbps and 2.048 Mbps. Consequently, the initially applied data order is recovered and data of 51 Mbps is transmitted to a desired channel.

As described-above, the data optical transmission apparatus of the present invention transmits twenty four data of 51 Mbps utilizing multiplexer/demultiplexer mode, which is simple in construction and low in manufacturing cost.

Although the preferred embodiments of the invention have been disclosed for illustrative purposes, those skilled in the art will appreciate that various modification, additions and substitutions are possible, without departing from the scope and spirit of the invention as disclosed in the accompanying claims.

What is claimed is:

1. A data optical transmission apparatus utilizing multiplexer/demultiplexer mode, comprising:

a 24:1 multiplex means for converting 44.736 Mbps data of twenty four channels, 2.048 Mbps data of twenty four channels and channel partition information data of 64 Kbps of twenty four channels into 51 Mbps data, for multiplexing the 51 Mbps data by 24:1, and for transmitting the channel partition information which partitions each of the twenty four signals; and a 1:24 demultiplex means for converting the transmitted signals from the 24:1 multiplex means into 44.736 Mbps data of twenty four channels and 2.048 Mbps data of twenty four channels, for demultiplexing the converted data by 1:24, and for generating data in the initially input order according to the channel partition information.

2. A data optical transmission apparatus utilizing multiplexer/demultiplexer mode according to claim 1, wherein the 24:1 multiplex means comprises:

a channel partition information producing section (10) for producing channel partition information of twenty four channels of 64 Kbps;

a 51 Mbps framer (20) for producing 51 Mbps frame data at each channel from 44.736 Mbps data of twenty four channels, 2.048 Mbps data of twenty channels and the 64 Kpbs data of twenty four channels which has the channel partition information produced by the channel partition information producing section (10);

a data shifting section (30) for shifting the 51 Mbps frame data generated by the 51M framer (10) in the unit of frame;

a 3:1 multiplexer (40) and a 8:1 multiplexer (50) for sequentially multiplexing twenty four 51 Mbps frame data generated by the data shifting section (30); and an optical transmitting section of 1.2 Gbps (60) for generating as an optical signal the frame data of 1.2 Gbps which has been multiplexed by the 8:1 multiplexer (50).

3. A data optical transmission apparatus utilizing multiplexer/demultiplexer mode according to claim 2, wherein the channel partition information producing section (10) comprises:

a 1/64 divider (11) reset by reset signal (/RESET) for dividing clock signals (CLK4M) by 1/64;

counters (12, 13) connected in series for counting the output signal of the ¹⁄₆₄ divider (11); and a producing and outputting section (14) for producing twenty four different output partition information with the output signals of the counters (12, 13).

4. A data optical transmission apparatus utilizing multiplexer/demultiplexer mode according to claim 2, wherein the channel partition information producing section (10) produces channel aligning data and applies the channel aligning data to 24 channels of 64 Kbps, the channel aligning data comprising a frame word of 8 bits, channel partition data of 5 bits, parity information of 1 bit and format of 2 bits to which is applied an optional number of "0" or "1".

5. A data optical transmission apparatus utilizing multiplexer/demultiplexer mode according to claim 1, wherein the 1:24 demultiplex means comprises:

1.2 Gbps optical receiving section (70) for converting the optical signal transmitted from the 24:1 multiplex means into electrical signal;

a 1:8 demultiplexer (80) and a 1:3 demultiplexer (90) for sequentially demultiplexing signal received from the optical transmitting section (70);

a 51 Mbps reframer (100) for reframing the twenty four 51 Mbps frame data generated by the 1:3 demultiplexer (90) into 44.736 Mbps data, 2.048 Mbps data and 64 Kbps data;

distribution switches (120, 130) for switching twenty four 44.736 Mbps data and twenty four 2.048 Mbps data separated from the 51 Mbps reframer (100) and for distributing the switched data to each subscriber system; and a channel partition information latch section (110) for causing the distribution switches (120,130) to distribute and generate data of each channel according to the 64 Kbps data separated by the 51M reframer (100).

6. A data optical transmission apparatus utilizing multiplexer/demultiplexer mode according to claim 5, wherein the channel partition information latch section (110) comprises:

a frame data latch section (110A) for detecting channel partition information out of the 64 Kbps data separated from the 51 Mbps reframer (100) and for applying output addresses to the distribution switches (120, 130); and an input address/enabling signal outputting section (110B) for counting clock signal when the frame data latch section (110A) finishes the generating of the output address, and for applying input addresses (q_0~4) and enabling signals (en_0~23) to the distribution switches (120, 130).

7. A data optical transmission apparatus utilizing multiplexer/demultiplexer mode according to claim 6, wherein the frame data latch section (110A) comprises:

a serial/parallel shifting register (111) for generating the channel aligning data (chid_0~23) in parallel, which is applied in serial;

a frame word detecting section (112) for detecting frame word of 8 bits from the output signal of the serial/parallel shift register (111) and for generating frame data detecting completed signal; and an outputting address producing latch section (113) for storing the channel partition information generated by the serial/parallel shifting register (111) and for generating the information as addresses according to the output signal of the frame word detecting section (112).

8. A data optical transmission apparatus utilizing multiplexer/demultiplexer mode according to claim 6, wherein the input address/enabling signal outputting section 110B comprises:

counters (116, 117) enabled according to the frame data detecting completed signal generated by the frame data latch section (110A) for counting clock signal (CLK16);

an input address outputting section (118) for storing the output signal of the counters (116, 117) and for generating the output signal of the counters (116, 117) as input addresses (q_0~4) according to the output addresses (CIB_0~4) which are designated by the frame data latch section (110A); and an enabling signal producing section (119) for identifying that all the input/output addresses of the distribution switches (120, 130) are designated according to the output signal of the input address outputting section (118), and for producing enabling signals (en_0~23) which initiate switch output.

\* \* \* \* \*